2,890,148

MODIFIED UREA ADHESIVES

Joseph B. Dede, Jr., West Springfield, Mass., assignor to Monsanto Chemical Company, St. Louis, Mo., a corporation of Delaware No Drawing. Application August 16, 1956
Serial No. 604,320

7 Claims. (Cl. 154—133)

This invention relates to modified urea-formaldehyde adhesives. More particularly, the invention relates to modified urea-formaldehyde adhesives which are suitable for use in laminating wood or a wood product to itself or to other materials. The invention also relates to laminates prepared by the use of these modified adhesives and to methods of preparing such laminates.

Urea-formaldehyde adhesives have been found effective for use in making plywood and related products. They have the particular advantages of relatively low cost, fairly good water resistance, and the speed with which they can be cured. It has now been found that these adhesives can be improved by modification with certain latices as hereinafter described.

One object of this invention is to provide new adhesives.

Another object is to provide modified urea-formaldehyde adhesives.

Another object is to provide modified urea-formaldehyde adhesives which are particularly useful for laminating wood or a wood product to itself or to other materials.

A further object is to provide a method of laminating wood or a wood product to itself or to other materials by the use of these modified urea-formaldehyde adhesives.

These and other objects are attained by combining a water-dispersible thermosetting urea-formaldehyde resin with a latex of a quadricomponent interpolymer as hereinafter described and laminating wood or a wood product to itself or to another material with the modified urea-formaldehyde adhesive between the two surfaces to be joined.

The following examples are given to illustrate the invention. Where parts are mentioned, they are parts by weight.

EXAMPLE I

A liquid urea-formaldehyde resin containing 65% solids and having a final formaldehyde to urea mol ratio of about 2:1 is prepared by conventional procedures. Fifteen parts of pecan shell flour are stirred into 67 parts of the resin, another 33 parts of resin are added to the mix, and 25 parts of a 50% solids latex of an interpolymer of 52% styrene, 6% acrylonitrile, 2% methacrylic acid, and 40% 2-ethyl hexyl acrylate are added with agitation. Ten parts of water and 1 part of ammonium chloride are incorporated into the mix, and stirring is continued until the ingredients are thoroughly blended. The adhesive is now ready for use.

EXAMPLE II

A liquid urea-formaldehyde resin containing 60% solids and having a final formaldehyde to urea mol ratio of about 2:1 is prepared by conventional procedures. Eighty parts of the resin are mixed with 35 parts of wheat flour, and 30 parts of a 50% solids latex of an interpolymer of 40% 2-ethyl hexyl methacrylate, 50% styrene, 6% acrylonitrile, and 4% acrylic acid are added to the mix with agitation. Then 25 parts of water and 2 parts of ammonium chloride are incorporated into the mix, and stirring is continued until the ingredients are thoroughly blended.

The resin-latex adhesives of this invention are especially effective for laminating wood or a wood product such as hardboard, chipboard, etc., to itself or to other materials such as melamine decorative laminates, paper, fabrics, etc. The following examples illustrate the lamination of woods with the adhesives of the invention.

EXAMPLE III

A laminate is prepared by coating both sides of a wood core with about 35 pounds per 1000 square feet of glue line of the adhesive of Example I, placing a birch ply on either side of the core to form a sandwich, pressing the assembly for about 5 minutes at 200 p.s.i. at a platen temperature of about 240° F., and removing the heat and pressure. The plies of the final set laminate cannot be separated without about 78% wood failure.

EXAMPLE IV

A wood core, coated on both sides with about 35 pounds per 1000 square feet of glue line of the adhesive of Example I, is sandwiched between two face veneers to form a substantially flat assembly. The assembly is subjected to pressure at a temperature of about 70°–120° F. to form a unitary structure, and the surface of the structure is then finished, e.g., by planing or sanding. When surface finishing is accomplished, the structure is subjected to heat and pressure between the faces of a mold to form a contoured-surfaced plywood article.

The quadricomponent interpolymer of the invention is an interpolymer containing (1) 35 to 60 parts by weight of an unsaturated ester of the group consisting of straight-chain and branched-chain alkyl acrylates and alkyl methacrylates wherein the alkyl radical contains about 5 to 20 carbon atoms and has about 5 to 14 carbon atoms in the longest continuous chain thereof, (2) 3 to 10 parts by weight of an unsaturated nitrile of the group consisting of acrylonitrile and methacrylonitrile, (3) 2 to 5 parts by weight of an unsaturated monocarboxylic acid of the group consisting of acrylic acid, methacrylic acid, cinnamic acid, atropic acid, and crotonic acid, and (4) correspondingly, 60 to 25 parts by weight of a monovinylidene aromatic hydrocarbon. For example, the interpolymer may contain 52% styrene, 6% acrylonitrile, 2% methacrylic acid, and 40% 2-ethyl hexyl acrylate.

The interpolymers are prepared by partially polymerizing all of the unsaturated nitrile component with from 1.5 to 3 times its weight of the vinylidene aromatic hydrocarbon component, adding all of the remaining components, and completing the interpolymerization reaction. These interpolymers and processes for preparing them are more completely described in patent application Ser. No. 467,654, filed November 8, 1954, in the name of Ernest Alexander Sutton, now U.S. Patent 2,767,153.

The interpolymer is added to the urea-formaldehyde resin as an aqueous latex containing about 50% solids. On a dry weight basis, the amount of interpolymer incorporated in the resin-latex adhesive may vary from about 1 to 83 parts by weight of the interpolymer per 100 parts of dry urea-formaldehyde resin.

The urea-formaldehyde resins which form a basis for the adhesives of the invention are water-dispersible condensates of urea with formaldehyde which may be prepared by conventional procedures and which are capable of being converted to the insoluble, infusible state. The condensates preferably contain about 1.5 to 2.5 mols of formaldehyde per mol of urea. The resin may be combined with the interpolymer latex in the liquid state, i.e., as an aqueous dispersion in the reaction medium in which it was formed, or it may be spray-dried and the dry resin then added to the interpolymer latex with sufficient agitation to disperse the resin throughout the latex.

The amount of added water in the resin-latex adhesive varies with the viscosity desired for a particular adhesive. Ordinarily the adhesive includes about 0 to 135 parts of added water per 100 parts of urea-formaldehyde resin. The preferred wet glue spread for laminating wood is about 30 to 40 pounds per 1000 square feet of glue line.

The additives included in these adhesives are the conventional additives used in urea-formaldehyde adhesives, e.g., wheat flour, pecan shell flour, starch, dextrin, etc. The adhesive usually contains about 10 to 225 parts of such filler materials per 100 parts of urea-formaldehyde resin. Acids or salts which liberate acids by hydrolysis or on heating are incorporated to accelerate the cure of the urea-formaldehyde resin. Ammonium chloride is one of the commonly used catalysts.

The resin-latex adhesives of the invention are suitable for use in laminating woods by hot- or cold-pressing operations. The addition of the latex to the urea-formaldehyde resin imparts sufficient flexibility to the adhesives to make them suitable for use in forming contoured-surfaced plywood articles by cold pressing a flat assembly of adhesive-coated wood piles, surface finishing the thus-formed unitary structure, and then deforming the structure by applying heat and pressure thereto between the faces of a mold.

The improved quality of the bond obtained by the use of these adhesives in the lamination of birch plies is illustrated in Table I. Both samples are birch plywood, prepared under substantially the same conditions of wet glue spread, assembly time, pressing time, pressure, and platen temperature. The adhesive used in making Sample A contains the same ingredients in the same proportions as the adhesive of Example I, with the exception that no latex is included. The adhesive of Example I was used in making Sample B. The wet samples tested for shear strength and wood failure were obtained by soaking the dry plywood samples in water for 3 hours at 145° F.

*Table I*

| Sample | Shear Strength (Dry Sample), pounds per square inch | Wood Failure (Dry Sample), percent | Shear Strength (Wet Sample), pounds per square inch | Wood Failure (Wet Sample), percent |
| --- | --- | --- | --- | --- |
| A | 342 | 32 | 234 | 14 |
| B | 358 | 78 | 300 | 46 |

It is obvious that many variations may be made in the products and processes set forth above without departing from the spirit and scope of the invention.

What is claimed is:

1. An adhesive comprising an aqueous dispersion of 100 parts by weight of a water-dispersible thermosetting urea-formaldehyde resin and 1 to 83 parts by weight of a quadricomponent interpolymer of (1) 35 to 60 parts by weight of an unsaturated ester of the group consisting of alkyl acrylates and alkyl methacrylates wherein the alkyl radical contains about 5 to 20 carbon atoms and has about 5 to 14 carbon atoms in the longest continuous chain thereof, (2) 3 to 10 parts by weight of an unsaturated nitrile of the group consisting of acrylonitrile and methacrylonitrile, (3) 2 to 5 parts by weight of an unsaturated monocarboxylic acid of the group consisting of acrylic acid, methacrylic acid, cinnamic acid, atropic acid, and crotonic acid, and (4) correspondingly, 60 to 25 parts by weight of styrene, said interpolymer having been prepared by partially polymerizing all of the unsaturated nitrile component with from 1.5 to 3 times its weight of styrene and completing the interpolymerization reaction after adding all of the remaining components.

2. An adhesive as in claim 1 wherein the interpolymer contains 52 parts by weight of styrene, 6 parts by weight of acrylonitrile, 2 parts by weight of methacrylic acid, and 40 parts by weight of 2-ethyl hexyl acrylate.

3. A process for preparing an adhesive which comprises forming a homogeneous mixture of a water-dispersible thermosetting urea-formaldehyde resin and an aqueous latex containing a quadricomponent interpolymer of (1) 35 to 60 parts by weight of an unsaturated ester of the group consisting of alkyl acrylates and alkyl methacrylates wherein the alkyl radical contains about 5 to 20 carbon atoms and has about 5 to 14 carbon atoms in the longest continuous chain thereof, (2) 3 to 10 parts by weight of an unsaturated nitrile of the group consisting of acrylonitrile and methacrylonitrile, (3) 2 to 5 parts by weight of an unsaturated monocarboxylic acid of the group consisting of acrylic acid, methacrylic acid, cinnamic acid, atropic acid, and crotonic acid, and (4) correspondingly, 60 to 25 parts by weight of styrene, said interpolymer having been prepared by partially polymerizing all of the unsaturated nitrile component with from 1.5 to 3 times its weight of styrene and completing the interpolymerization reaction after adding all of the remaining components.

4. A laminate comprising a plurality of surfaces, at least one of which surfaces is a material of the group consisting of wood and wood products, said surfaces being bonded together by means of the adhesive of claim 1.

5. A contoured-surfaced plywood article comprising a plurality of wood plies bonded together by means of the adhesive of claim 1.

6. A process for laminating a material of the group consisting of wood and wood products which comprises applying the adhesive of claim 1 to one of the surfaces to be joined, contacting the surfaces to be joined, and subjecting the assembly to heat and pressure to form a unitary structure.

7. A process for post-forming plywood articles which comprises forming a substantially flat assembly comprising a plurality of wood plies having therebetween the adhesive of claim 1, cold pressing said assembly at a temperature of about 70°–120° F. to form a flat unitary structure, surface finishing said unitary structure, and thereafter deforming said unitary structure by applying heat and pressure thereto between the faces of a mold.

References Cited in the file of this patent

UNITED STATES PATENTS

| | | |
| --- | --- | --- |
| 1,329,402 | Henning | Feb. 3, 1920 |
| 2,405,983 | Sharkey et al. | Aug. 20, 1946 |
| 2,534,717 | Kropa et al. | Dec. 19, 1950 |
| 2,537,019 | Barrett | Jan. 9, 1951 |
| 2,604,463 | Bilton et al. | July 22, 1952 |
| 2,767,153 | Sutton | Oct. 16, 1956 |
| 2,787,603 | Sanders | Apr. 2, 1957 |